United States Patent
Huang

[11] Patent Number: 5,977,747
[45] Date of Patent: Nov. 2, 1999

[54] CELLULAR PHONE BATTERY CHARGER WITH AN EMERGENCY BATTERY CHARGING FUNCTION

[76] Inventor: Hsin-Wei Huang, No. 2 Lane 185, Huan-Ho N. Rd., Sec. 2, Taipei, Taiwan

[21] Appl. No.: 09/136,915

[22] Filed: Aug. 2, 1998

[51] Int. Cl.[6] .................................................. H02J 7/00
[52] U.S. Cl. ............................................ 320/115; 320/107
[58] Field of Search .................................. 320/115, 107; 455/89

[56] References Cited

U.S. PATENT DOCUMENTS

| | | | |
|---|---|---|---|
| 3,644,873 | 2/1972 | Dalton et al. | 320/115 |
| 5,334,076 | 8/1994 | Shinozuka | 320/115 |
| 5,394,073 | 2/1995 | Nagai | 320/115 |
| 5,659,236 | 8/1997 | Hahn | 320/115 |
| 5,883,494 | 3/1999 | Kobayashi et al. | 320/115 |

*Primary Examiner*—Peter S. Wong
*Assistant Examiner*—K. Shin
*Attorney, Agent, or Firm*—Rosenberg, Klein & Lee

[57] ABSTRACT

A cellular phone battery charger includes a housing, a control circuit assembly mounted within the housing, the control circuit assembly having a power jack for obtaining power supply from a car battery by a cable or a city power supply outlet by a transformer, a coupling element mounted in the housing at the rear side to hold any of a variety of cellular phone connectors for connection to a particular cellular phone, and a batter holder mounted in the housing at the front side and electrically connected to the control circuit assembly for receiving a 9V alkaline battery for providing battery power supply to the connected cellular phone in an emergency case.

1 Claim, 4 Drawing Sheets

CELLULAR PHONE BATTERY CHARGER WITH AN EMERGENCY BATTERY CHARGING FUNCTION

BACKGROUND OF THE INVENTION

The present invention relates to cellular phone battery chargers, and more particularly to a cellular phone battery charger with an emergency battery charging function which can be attached with a 9V alkaline battery to provide battery power supply to the connected cellular phone when in an emergency case.

FIG. 4 shows the arrangement of a cellular phone adapter with the related peripheral apparatus according to the prior art. The cellular phone adapter 9 has a signal jack for receiving the plug 51 of a hand-free speaker and microphone circuit assembly 5, a power jack for receiving the first plug 93 of a cable 91, which has a second plug 92 for connection to the socket for cigarette lighter of a motor vehicle to obtain car battery power supply from it, and an electric connector for connection to a cellular phone 8. If the cellular phone user leaves from the car to a far place and the battery power of the cellular phone is low, the cellular phone becomes unable to function.

SUMMARY OF THE INVENTION

The present invention has been accomplished to provide a cellular phone battery charger which eliminates the aforesaid problem. According to one aspect of the present invention, the cellular phone battery charger comprises a housing, a control circuit assembly mounted within the housing the control circuit assembly having a power jack for obtaining power supply from a car battery by a cable or a city power supply outlet by a transformer, and a coupling element mounted in the housing at the rear side to hold any of a variety of cellular phone connectors for connection to a particular cellular phone. According to another aspect of the present invention, the cellular phone battery charger further comprises a batter holder mounted in the housing at the front side an electrically connected to the control circuit assembly for receiving a 9V alkaline battery for providing battery power supply to the connected cellular phone in an emergency case.

DETAILED DESCRIPTION OF THE PREFERRED EMBODIMENT

Figure 1:
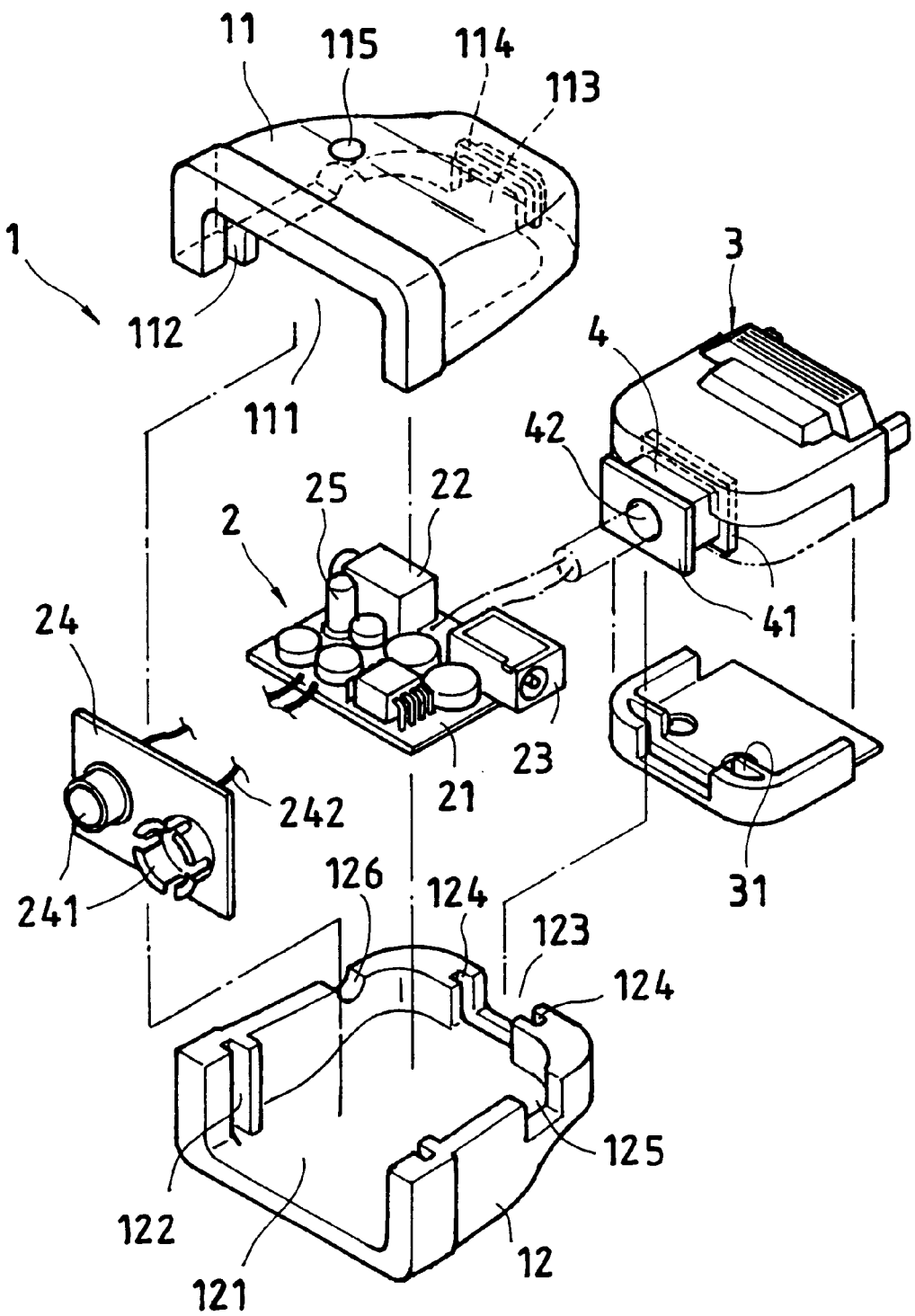
FIG. 1 is an exploded view of a cellular phone battery charger according to the present invention.
Figure 2:
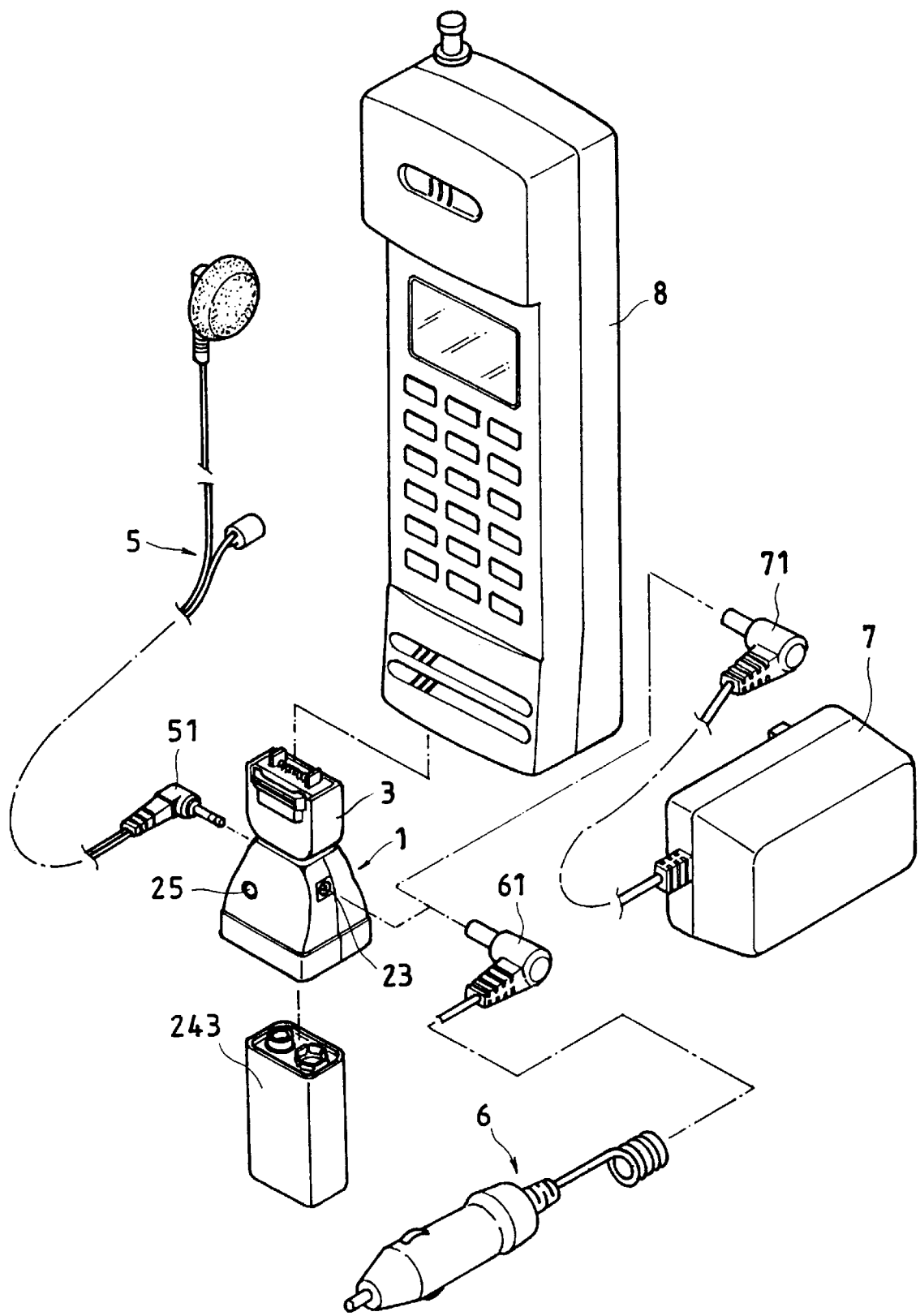
FIG. 2 shows arrangement of the cellular phone battery charger and the related peripheral apparatus according to the present invention.
Figure 3:
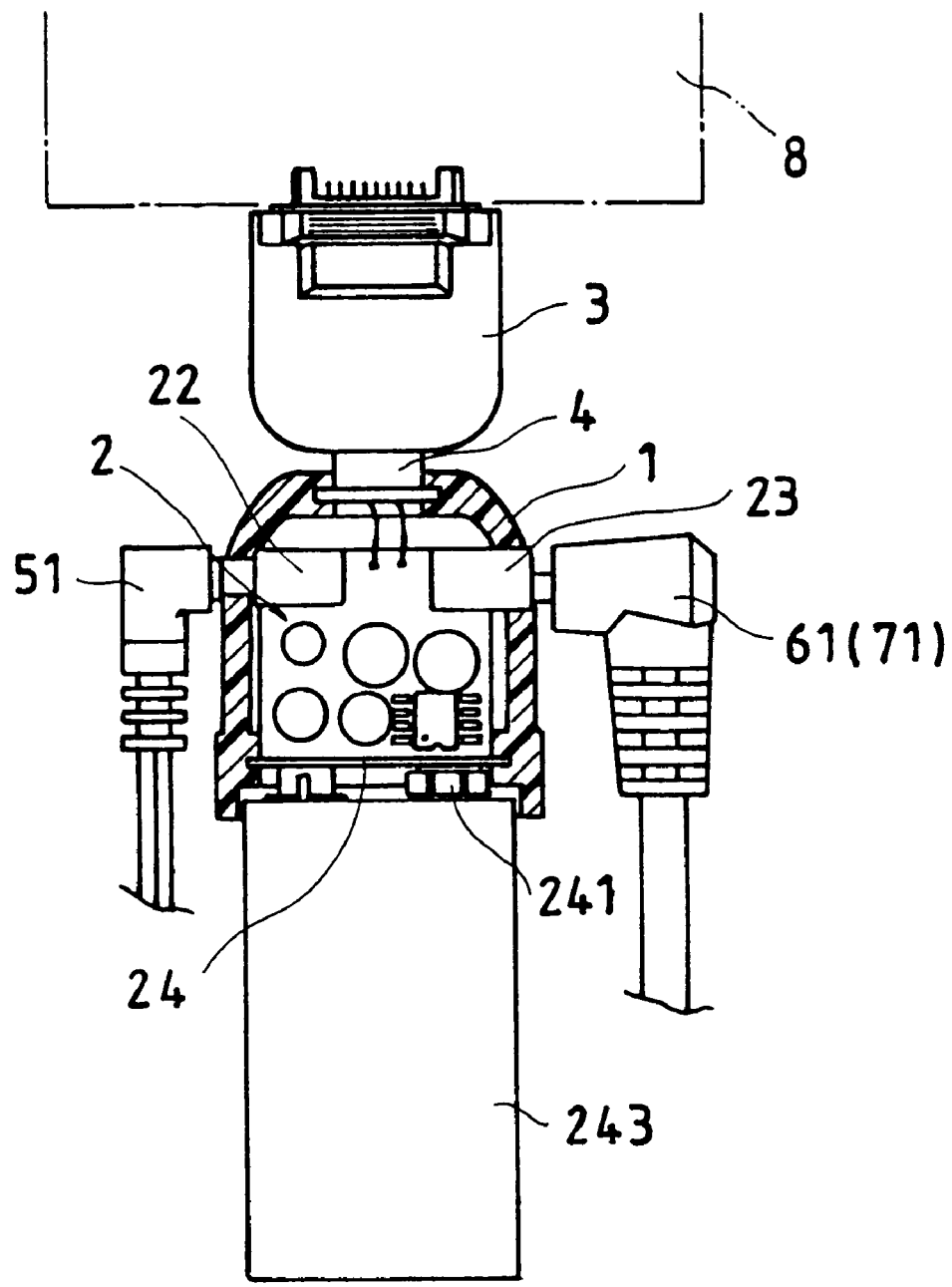
FIG. 3 is a sectional view showing an application example of the present invention.
Figure 4:
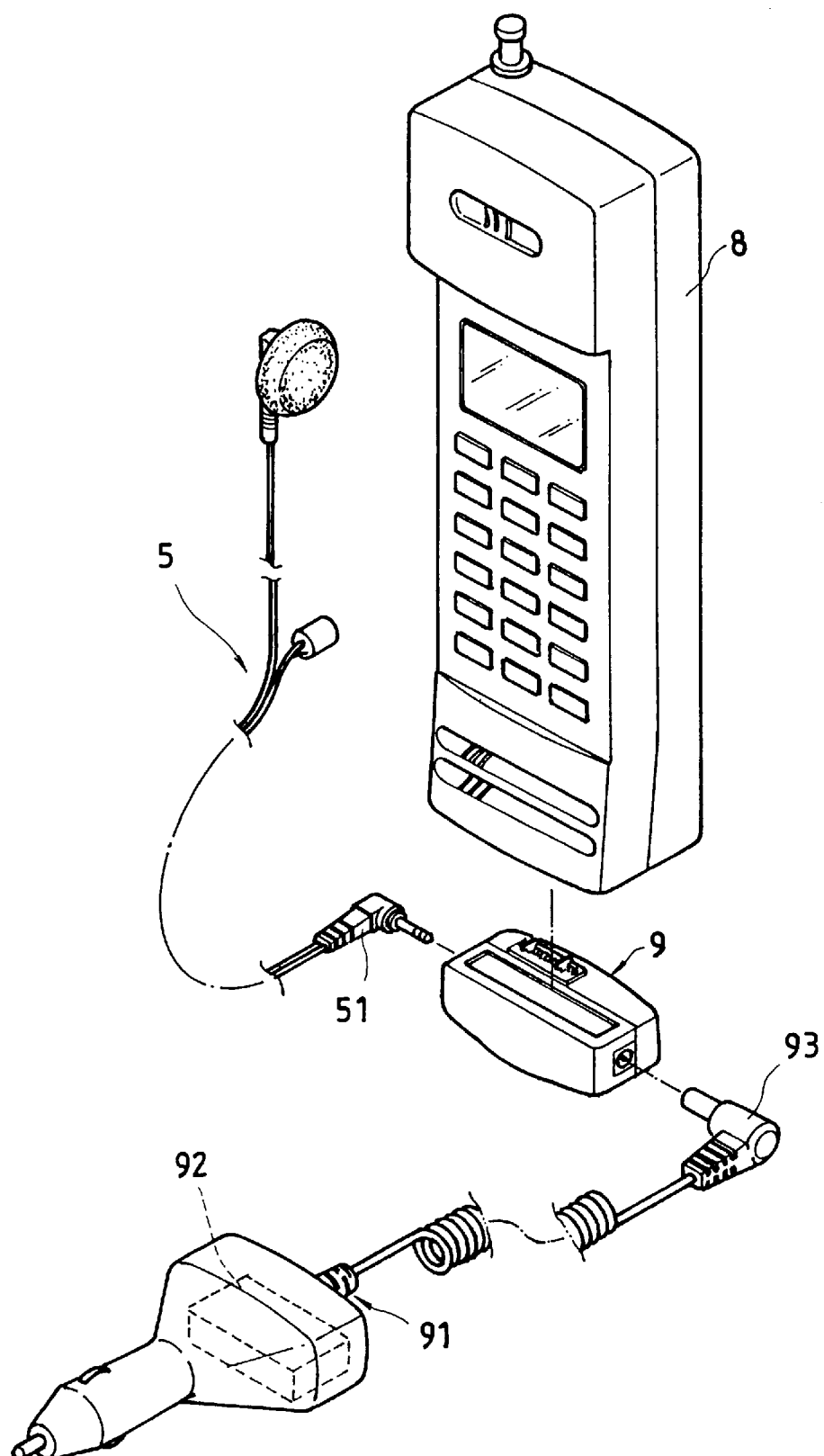
FIG. 4 shows the arrangement of a cellular phone adapter and the related peripheral apparatus according to the prior art.

Referring to FIGS. 1, 2 and 3, a battery charger in accordance with the present invention comprises a housing 1, and a control circuit assembly 2 mounted within the housing 1.

The control circuit assembly 2 comprises a circuit board 21, a signal jack 22 mounted on the circuit board 21 at a suitable location for receiving the plug 51 of a hand-free speaker and microphone circuit assembly 5, a power jack 23 mounted on the circuit board 21 at a suitable location for receiving the plug 61 of a cable 6 for connection to the socket for cigarette lighter of a motor vehicle, or the plug 71 of a transformer 7.

The housing 1 is comprised of a first cover shell 11, and a second cover shell 12. The cover shells 11,12 each comprise a front opening 111,121, two vertical mounting grooves 112,122 at two opposite sides of the front opening 111,121, a rear opening 113,123, and two vertical mounting grooves 114,124 at two opposite sides of the rear opening 113,123. The first cover shell 11 further comprises a lamp hole 115, which receives a LED indicator 25 of the control circuit assembly 2. The second cover shell 12 further comprises a first side notch 125 at one side, which receives the power jack 23, and a second side notch 126 at an opposite side, which receives the signal jack 22. A battery holder 24 is fastened to the vertical mounting grooves 112,122 between the cover shells 11,12. The battery holder 24 holds a pair of terminal connectors 241 for receiving the positive and negative terminals of a 9V alkaline battery 243. The terminal connectors 241 are electrically connected to the circuit board 21 of the control circuit assembly 2 by electric wires 242. A cellular phone connector 3 is provided for connecting the control circuit assembly 2 to a cellular phone 8. A coupling element 4 is mounted in the rear opening 113,123 to hold the cellular phone connector 3 in place. The coupling element 4 comprises two mounting boards 41 respectively fastened to the mounting grooves 113,124 between the cover shells 11,12 and respective mounting grooves 31 inside the cellular phone connector 3, and a through hole 42 through which the electric cable of the cellular phone connector 3 passes to the circuit board 21 of the control circuit assembly 2.

When charging the cellular phone 8, a cable 6 can be used to connect the power jack 23 to the socket for cigarette lighter of a motor vehicle, enabling car battery power supply to be directly charged to the cellular phone 8. Alternatively, a transformer 7 can be connected to the power jack 23 to obtain power supply from a city power supply outlet. If neither car battery power supply nor city power supply is available a 9V alkaline battery 243 can be directly connected to the terminal connectors 241 to provide battery power supply to the cellular phone 8.

What the invention claimed is:

1. A cellular phone battery charger comprising:

a housing formed of two cover shells, said housing comprising a front opening, a rear opening, a first side notch at one side, a second side notch at an opposite side, and a lamp hole at a top side thereof;

a control circuit assembly mounted inside said housing, said control circuit assembly comprising a power jack received in said first side notch within said housing for receiving the plug of a cable for connection to the socket for cigarette lighter of a motor vehicle or the plug of a transformer for obtaining power supply from a city power supply outlet, and a signal jack received in said second side notch within said housing for receiving the plug of a hand-free speaker and microphone circuit assembly;

a battery holder mounted in said front opening within said housing, said battery holder having a set of terminal connectors electrically connected to said control circuit assembly by electric wires for receiving a 9V alkaline battery;

a coupling element mounted in said rear opening within said housing, said coupling element having a through hole; and a cellular phone connector coupled to said coupling element for connecting said control circuit assembly to a cellular phone, said cellular phone connector comprising a cable inserted through the through hole on said coupling element and connected to said control circuit assembly.

* * * * *

UNITED STATES PATENT AND TRADEMARK OFFICE
CERTIFICATE OF CORRECTION

PATENT NO. : 5,977,747
DATED : Nov. 2, 1999
INVENTOR(S) : Hsin-Wei Huang

It is certified that error appears in the above-identified patent and that said Letters Patent is hereby corrected as shown below:

TITLE PAGE, BLOCK [22]; DELETE THE DATE "AUG. 2, 1998" AND INSERT THEREFORE--AUG. 20, 1998--

Signed and Sealed this

Third Day of April, 2001

Attest:

NICHOLAS P. GODICI

Attesting Officer

Acting Director of the United States Patent and Trademark Office